United States Patent
Nakajima et al.

(10) Patent No.: US 7,199,212 B2
(45) Date of Patent: Apr. 3, 2007

(54) POLYMERIZATION CATALYST FOR POLYESTERS, POLYESTERS PRODUCED WITH THE SAME AND PROCESS FOR PRODUCING POLYESTERS

(75) Inventors: Takahiro Nakajima, Ohtsu (JP); Kenichi Tsukamoto, Ohtsu (JP); Shoichi Gyobu, Ohtsu (JP); Maki Sato, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 10/169,491

(22) PCT Filed: Dec. 25, 2000

(86) PCT No.: PCT/JP00/09219

§ 371 (c)(1),
(2), (4) Date: Jul. 3, 2002

(87) PCT Pub. No.: WO01/49771

PCT Pub. Date: Jul. 12, 2001

(65) Prior Publication Data

US 2003/0045673 A1 Mar. 6, 2003

(30) Foreign Application Priority Data

| Jan. 5, 2000 | (JP) | 2000-000282 |
| Jan. 26, 2000 | (JP) | 2000-016428 |
| Apr. 12, 2000 | (JP) | 2000-110163 |
| Apr. 12, 2000 | (JP) | 2000-110171 |
| Apr. 12, 2000 | (JP) | 2000-110172 |

(51) Int. Cl.
*C08G 63/78* (2006.01)
*C08F 4/00* (2006.01)

(52) U.S. Cl. .................. 528/282; 528/275; 528/277; 528/280; 528/283; 528/285; 528/286; 528/308.6; 524/708; 524/710; 524/777; 524/785; 524/786; 502/102; 502/103; 502/113; 502/132; 502/155; 502/162; 502/183; 502/184

(58) Field of Classification Search .............. 528/275, 528/277, 280, 282, 283, 285, 286; 524/708, 524/710, 777, 785, 786; 502/102, 103, 113, 502/132, 155, 162, 183, 184
See application file for complete search history.

(56) References Cited

U.S. PATENT DOCUMENTS

| 1,348,146 A | 8/1920 | Jackson et al. |
| 3,329,651 A | 7/1967 | Dobinson et al. |
| 3,574,174 A | 4/1971 | Bayer et al. |
| 3,594,347 A | 7/1971 | Lazarus et al. |
| 3,847,873 A | 11/1974 | Jackson et al. |
| 4,565,845 A * | 1/1986 | Inoue et al. ............ 525/25 |
| 4,829,113 A | 5/1989 | Rosenfeld |
| H000766 H | 4/1990 | Yu |
| 5,237,042 A | 8/1993 | Kim et al. |
| 5,326,831 A | 7/1994 | Yezrielev et al. |
| 5,334,671 A | 8/1994 | Yezrielev et al. |
| 5,399,607 A | 3/1995 | Nanbu et al. |
| 5,512,340 A | 4/1996 | Goodley |
| 5,554,720 A | 9/1996 | Weaver et al. |
| 5,561,183 A | 10/1996 | Kwon et al. |
| 5,596,069 A | 1/1997 | Goodley |
| 5,639,825 A | 6/1997 | Nanbu et al. |
| 5,652,033 A | 7/1997 | Goodley |
| 5,674,801 A | 10/1997 | George |
| 5,733,969 A | 3/1998 | Thiele |
| 5,744,572 A | 4/1998 | Schumann et al. |
| 5,770,682 A | 6/1998 | Ohara et al. |
| 5,782,935 A | 7/1998 | Hirt et al. |
| 5,847,011 A | 12/1998 | Terado et al. |
| 5,869,582 A | 2/1999 | Tang et al. |
| 6,156,867 A | 12/2000 | Aoyama et al. |
| 6,239,200 B1 | 5/2001 | Kao et al. |
| 6,392,005 B1 | 5/2002 | Jen |
| 6,489,434 B2 | 12/2002 | Jen |
| 6,589,324 B2 | 7/2003 | Kamo et al. |

FOREIGN PATENT DOCUMENTS

| CH | 495 395 A | 8/1970 |
| CH | 495 395 | 8/1970 |
| CN | 1067662 A | 1/1993 |
| CN | 1153185 A | 7/1997 |
| CN | 1154728 | 7/1997 |

(Continued)

OTHER PUBLICATIONS

Adding Value to Polymers, Ciba Specialty Chemicals, K.K, Publ. No. J–99–001, pp. 8 and 12.
"Experimental Results: 1. PET Polymerization Experiment using Aluminum Acetylacetonate/Lithium Acetate (0.014 mol–%/0.025 mol–%) as catalyst; 2. PET Polymerization Experiment using Aluminum Acetylacetonate/Lithium Acetate (0.014mol–%/0.1 mol–%) as catalyst," conducted by (Exp. 1, polymerization) M. Kuwata (according to direction of T. Nakajima), Sep. 9, 1999; (Exp. 1, measurement of TD) T. Nakajima, Oct. 26, 1999; (Exp. 2, polymerization) M. Kuwata (according to direction of T. Nakajima), Jun. 14, 2000; (Exp. 2, measurement of TD) T. Nakajima, Aug. 11, 2000.

*Primary Examiner*—Terressa Boykin
(74) *Attorney, Agent, or Firm*—Kenyon & Kenyon LLP

(57) ABSTRACT

A novel polymerization catalyst for polyesters, which does not contain any germanium or antimony compound as the main component; polyesters produced with the catalyst; and a process for producing polyesters. This polymerization catalyst is excellent in catalytic activity, little causes thermal degradation of polyesters in melt molding even when neither deactivated nor removed, and can give thermally stable polyesters which little generate foreign matter and are excellent in transparency and color. The polymerization catalyst is one which contains as the first metal-containing component at least one member selected from the group consisting of aluminum and aluminum compounds and which gives polyethylene terephthalate (PET) having a thermal stability parameter (TS) satisfying the relationship:
(1) TS<0.3.

26 Claims, No Drawings

FOREIGN PATENT DOCUMENTS

| | | |
|---|---|---|
| CN | 1175266 A | 3/1998 |
| CN | 1220677 A | 6/1999 |
| DE | 495395 | 8/1965 |
| EP | 0 419 669 A1 | 3/1991 |
| EP | 0 419 669 A1 | 4/1991 |
| EP | 0 419 669 A1 | 4/1991 |
| EP | 0 626 402 A3 | 5/1994 |
| EP | 0 626 402 A2 | 5/1994 |
| EP | 0 626 402 A2 | 11/1994 |
| EP | 0 626 402 A2 | 11/1994 |
| EP | 0 768 319 A1 | 4/1997 |
| EP | 0 768 319 A1 | 4/1997 |
| EP | 0 909 775 A1 | 4/1999 |
| EP | 909775 A | 4/1999 |
| GB | 1348146 | 3/1974 |
| GB | 1 348 146 | 3/1974 |
| JP | 03 231918 | 10/1971 |
| JP | 46 5395 | 11/1971 |
| JP | 46-40711 | 12/1971 |
| JP | S46-41031 B | 12/1971 |
| JP | 46-41031 | 12/1971 |
| JP | S49-32676 B | 9/1974 |
| JP | 49-32676 | 9/1974 |
| JP | 55-116722 | 9/1980 |
| JP | 55 116722 | 9/1980 |
| JP | 61-101527 | 10/1984 |
| JP | 60-35023 | 2/1985 |
| JP | 60-035023 | 2/1985 |
| JP | 60 035023 | 2/1985 |
| JP | 60-53532 | 3/1985 |
| JP | 60 053532 | 3/1985 |
| JP | 60 035023 | 7/1985 |
| JP | 61-101527 | 5/1986 |
| JP | 61 101527 | 5/1986 |
| JP | 3-215522 | 9/1991 |
| JP | 03 215522 | 9/1991 |
| JP | 3-231918 | 10/1991 |
| JP | 03 231918 | 10/1991 |
| JP | 5-287064 | 11/1993 |
| JP | 6-279579 | 10/1994 |
| JP | 06 279579 | 10/1994 |
| JP | 8-73581 | 3/1996 |
| JP | 08 073581 | 3/1996 |
| JP | 8 193127 | 7/1996 |
| JP | 08 193127 | 7/1996 |
| JP | 9-151242 | 6/1997 |
| JP | 9-151243 | 6/1997 |
| JP | 9-151244 | 6/1997 |
| JP | 2666502 | 10/1997 |
| JP | 09 291141 | 11/1997 |
| JP | 9-291141 | 11/1997 |
| JP | 10-36495 | 2/1998 |
| JP | 10 036495 | 2/1998 |
| JP | 10 251394 | 9/1998 |
| JP | 10-251394 | 9/1998 |
| JP | 10 259296 | 9/1998 |
| JP | 10-259296 | 9/1998 |
| JP | 10 324741 | 12/1998 |
| JP | 10-324741 | 12/1998 |
| JP | 11-49852 | 2/1999 |
| JP | 11-49852 A | 2/1999 |
| JP | 11 228681 | 8/1999 |
| JP | 11-228681 | 8/1999 |
| JP | 11-228681 A | 8/1999 |
| JP | 11-228682 A | 8/1999 |
| JP | 11 228682 | 8/1999 |
| JP | 11-228682 | 8/1999 |
| JP | 2000 63504 | 2/2000 |
| JP | 2000-302854 | 10/2000 |
| JP | 2001-26639 | 1/2001 |
| JP | 2001-113274 | 5/2001 |
| JP | 2001-131274 | 5/2001 |
| JP | 2001 131276 | 5/2001 |
| JP | 2001 163964 | 6/2001 |
| JP | 2001 278970 | 10/2001 |
| JP | 2002-226568 | 8/2002 |
| WO | WO 96/11978 | 4/1996 |
| WO | WO 96/41828 | 12/1996 |
| WO | WO 98/42769 | 10/1998 |
| WO | WO 99/28033 | 6/1999 |
| WO | WO 00/24804 | 5/2000 |
| WO | WO 00/71252 A1 | 11/2000 |
| WO | WO 01/42335 A1 | 6/2001 |
| WO | WO 02/068500 A1 | 9/2002 |

* cited by examiner

POLYMERIZATION CATALYST FOR POLYESTERS, POLYESTERS PRODUCED WITH THE SAME AND PROCESS FOR PRODUCING POLYESTERS

TECHNICAL FIELD

The present invention relates to a polyester polymerization catalyst, polyester produced by using the same and a process for producing polyester, and more particularly, relates to a novel polyester polymerization catalyst without using a germanium or antimony compound as a major catalytic component, polyester produced by using the same and a process for producing polyester.

BACKGROUND OF THE INVENTION

Polyesters represented by polyethylene terephthalate (PET), polybutylene terephthalate (PBT), polyethylene naphthalate (PEN) etc. are excellent in mechanical and chemical characteristics, and are used in various fields for example in fibers for clothing and industrial materials, films for packaging or for magnetic tapes, sheets, hollow molded articles such as bottles, casings for electrical or electronic parts, and other molded articles such as engineering plastics, depending on the characteristics of each polyester.

As typical polyester, polyester composed of an aromatic dicarboxylic acid and an alkylene glycol as major constituent components, for example polyethylene terephthalate (PET), is industrially produced by esterification or transesterification of terephthalic acid or dimethyl terephthalate and ethylene glycol to produce bis(2-hydroxyethyl) terephthalate which is then subjected to polycondensation at high temperatures in vacuum in the presence of a catalyst.

As a conventional polyester polymerization catalyst used in polycondensation of polyester, antimony trioxide has been used widely. Antimony trioxide is an inexpensive and highly active catalyst, but when antimony trioxide is used as a major component, that is, when it is used in such an amount as to exhibit a practical rate of polymerization, an antimony metal is precipitated to cause problems such as gray discoloration or generation of insoluble particle in polyester. For this reason, polyester absolutely free of antimony or excluding antimony as a major catalytic component is desired.

The above-described insoluble particle in polyester causes the following problems.

In polyester for film, the antimony metal precipitated serves as insoluble particle in polyester, which causes not only contamination of an outlet during melt extrusion but also deficiency on the surface of film. Further, when the polyester with insoluble particle is used as a starting material of hollow molded articles, it is difficult to obtain hollow molded articles excellent in transparency.

The insoluble particle in polyester for fibers serves as insoluble particle not only causing a reduction in the strength of fibers, but also deposits around spinnerets during spinning. In production of polyester fibers, a polyester polymerization catalyst not causing formation of insoluble particle is desired from the viewpoint of productivity.

As a method of solving the problem described above, an attempt had been made at preventing gray discoloration and formation of insoluble particle in PET while using antimony trioxide as a catalyst. In addition, in Japanese Patent No. 2666502, formation of black insoluble particle in PET is prevented by using antimony trioxide, a bismuth compound and a selenium compound as a polycondensation catalyst. Further, Japanese Patent Application Laid-Open No. 9-291141 describes that precipitation of an antimony metal is prevented when antimony trioxide containing sodium and iron oxides is used as a polymerization catalyst. However, these polycondensation catalysts cannot achieve the object of reducing the content of antimony in polyester.

As a method of solving the problem of the antimony catalyst in uses requiring transparency of PET bottles etc., for example Japanese Patent Application Laid-Open No. 6-279579 discloses a method of improving transparency by prescribing the proportion of antimony and phosphorus compounds used. However, it cannot be said that hollow molded articles made of polyester obtained by this method are sufficiently transparent.

Further, Japanese Patent Application Laid-Open No. 10-36495 discloses a process for producing polyester excellent in transparency, which includes use of antimony trioxide, phosphoric acid and a sulfonic acid compound. However, polyester obtained by such a method is poor in thermal stability, and there is the problem of a high content of acetaldehyde in the resultant hollow molded article.

Polycondensation catalysts substituted for antimony type catalysts such as antimony trioxide have also been examined, and titanium compounds represented by tetraalkoxy titanate or tin compounds have previously been proposed, but there is a problem that polyester produced by using these compounds is easily thermally degraded during melt molding, and the polyester is significantly discolored.

In an attempt at solving the problem arising when such titanium compounds are used as the polycondensation catalyst, for example Japanese Patent Application Laid-Open No. 55-116722 proposes a method of simultaneously using tetraalkoxy titanate in combination with a cobalt salt and a calcium salt. Further, Japanese Patent Application Laid-Open No. 8-73581 proposes a method of using tetraalkoxy titanate in combination with a cobalt compound as the polycondensation catalyst and simultaneously using a optical brightener. By these techniques, PET discoloration occurring when tetraalkoxy titanate is used as the polycondensation catalyst can be reduced, but prevention of thermal decomposition of PET cannot be achieved.

In another attempt at preventing thermal degradation during melt molding of polyester polymerized in the presence of a titanium compound as the catalyst, for example Japanese Patent Application Laid-Open No. 10-259296 describes a method of adding a phosphorus type compound after polymerization of polyester in the presence of the titanium compound as the catalyst. However, effective mixing of the additive with the polymer after polymerization is technically difficult and leads to higher costs, so this prior art method is not practically used under the present circumstances.

A method of adding an alkali metal compound to an aluminum compound to form a polyester polymerization catalyst having a sufficient catalytic activity is also known. When such a known catalyst is used, polyester which is excellent in thermal stability can be obtained, but this catalyst using an alkali metal compound in combination should be added in a larger amount in order to attain a practical catalytic activity, and as a result, there arises at least one of the following problems attributable to the alkali metal compound in the resultant polyester polymer.

The amount of insoluble particle is increased so that when the polyester is used in fibers, the spinnability and the physical properties of fibers are getting worse, and when used in films, the physical properties of films are getting worse.

The hydrolytic stability of the resultant polyester polymer is lowered, and due to formation of insoluble particle, the transparency thereof is lowered.

There arises the phenomenon of deficiency in color tone of the resultant polyester polymer, that is, yellow discoloration of the polymer, and when the polyester is used in films or hollow bottles, there arises the problem of deterioration in the color tone of the molded articles.

During production of molded articles by melt molding, filter pressure is increased due to clogging of a filter with insoluble particle, to lower productivity.

As an non-antimony catalyst having an excellent catalytic activity and giving polyester free of the problem described above, a germanium compound has been practically used, but this catalyst has a problem that it is very expensive and easily distilled away from the reaction system during polymerization, thus changing the concentration of the catalyst in the reaction system and making control of polymerization difficult, so use of the germanium component as a major catalytic component is problematic.

For preventing thermal degradation of polyester during melt molding, there is also a method of removing a catalyst from polyester. Japanese Patent Application Laid-Open No. 10-251394 discloses a method of removing a catalyst from polyester wherein a polyester resin is brought into contact with an extractant as supercritical fluid in the presence of an acidic substance. However, the method of using such supercritical fluid is technically difficult and leads to higher costs for products, and is thus not preferable.

For the reasons described above, there is demand for a polymerization catalyst which comprises a metal component other than antimony and germanium as a major catalytic component, has an excellent catalytic activity, and gives polyester excellence in (a) thermal stability, (b) thermal oxidation stability and/or (c) hydrolytic stability thus hardly undergoing thermal degradation during melt molding and superior in transparency with less insoluble particle.

The present invention provides a polyester polymerization catalyst which excludes an antimony compound or a germanium compound as a major catalytic component, comprises aluminum as a major metal component, has an excellent catalytic activity, and without inactivating or removing the catalyst, gives polyester not only excellence in thermal stability by effectively inhibiting thermal degradation during melt molding but also superiority in color tone and transparency with less formation of insoluble particle.

Further, the present invention provides polyester which improves thermal stability, formation of insoluble particle and productivity during melt molding thereof into films, hollow molded articles such as bottles, fibers and engineering plastics by using the catalyst, and gives products superior in quality level by using virgin resin thereof or by reutilizing scraps thereof generated during molding, as well as a process for producing polyester by using the polyester polymerization catalyst.

Another object of the present invention is to provide a polyester polymerization catalyst which excludes an antimony compound or a germanium compound as a major catalytic component, comprises aluminum as a major metal component, has an excellent catalytic activity, and without inactivating or removing the catalyst, gives polyester which when formed into melt-molded articles, is not only excellent in heat aging resistance but also superior in color tone and transparency with less formation of insoluble particle.

Further, the present invention provides polyester which improves heat aging resistance, formation of insoluble particle and productivity when melt-molded into films, hollow molded articles such as bottles, fibers and engineering plastics, and so forth by using the catalyst and gives products superiority in quality level by using virgin resin thereof or by reutilizing scraps thereof generated during molding, as well as a process for producing polyester by using the polyester polymerization catalyst.

Another object of the present invention is to provide a polyester polymerization catalyst which excludes an antimony compound or a germanium compound as a major catalytic component, comprises aluminum as a major metal component, has an excellent catalytic activity, and without inactivating or removing the catalyst, gives polyester which when formed into melt-molded articles, is excellent not only in water resistance but also superior in transparency with less formation of insoluble particle.

Further, the present invention provides polyester which improves water resistance, formation of insoluble particle and productivity when melt-molded into films, hollow molded articles such as bottles, fibers and engineering plastics, and so forth by using the catalyst and gives products superiority in quality level in color tone with less discoloration by using virgin resin thereof or by reutilizing scraps thereof generated during molding, as well as a process for producing polyester by using the polyester polymerization catalyst.

DISCLOSURE OF INVENTION

The present invention relates to a polyester polymerization catalyst including at least one member selected from the group consisting of aluminum and compounds thereof as a first metal-containing component, is characterized in that the thermal stability parameter (TS) of polyethylene terephthalate (PET) polymerized by the polyester polymerization catalyst satisfies the following formula (1):

$$TS<0.30 \quad (1)$$

wherein TS is a numerical value calculated in the formula below, from the final intrinsic viscosity ($[IV]_f$) which is determined after 1 g PET having an initial intrinsic viscosity ($[IV]_i$) of approximately 0.65 dl/g is placed in a glass test tube, vacuum-dried at 130° C. for 12 hours, and maintained in a molten state at 300° C. for 2 hours in a non-circulating nitrogen atmosphere.

The non-circulating nitrogen atmosphere refers to a stationary nitrogen atmosphere e.g. in which a glass test tube containing resin chips is connected to a vacuum line and the replacement of the atmosphere by nitrogen is conducted five or more times by introducing nitrogen under reduced pressure, to achieve a nitrogen atmosphere at 100 Torr and the glass tube is sealed.

$$TS=0.245\{[IV]_f^{-1.47}-[IV]_i^{-1.47}\}$$

By use of the catalyst thus constituted, there can be obtained polyester giving molded articles excellent in melt thermal stability with less occurrence of discoloration and insoluble particle during heat melting in production of molded articles such as films, bottles and fibers.

TS is more preferably 0.25 or less, particularly preferably 0.20 or less.

In the present invention described above, the activity parameter (AP) preferably satisfies the following formula (2):

$$AP(min)<2T\ (min) \quad (2)$$

wherein AP is the time (min) necessary for polymerizing polyethylene terephthalate having an intrinsic viscosity of 0.65 dl/g at 275° C. under reduced pressure of 0.1 Torr in the presence of a predetermined amount of a catalyst, and T is the AP determined in the presence of antimony trioxide as the catalyst in an amount of 0.05 mol % in terms of antimony atom relative to the acid component in polyethylene terephthalate formed.

In measurement of T, antimony trioxide having 99% or more purity, for example Antimony (III) oxide (a product of Aldrich Chemical, 99.999% purity) is used.

The method of measuring AP is specifically as follows:

(In the step of producing BHET) Terephthalic acid and ethylene glycol in the molar ratio of 1:2 are used to produce a mixture of bis(2-hydroxyethyl) terephthalate (BHET) and oligomers (referred to hereinafter as BHET mixture) having a degree of esterification of 95%.

(In the step of adding a catalyst) A predetermined amount of a catalyst is added to the BHET mixture, and the mixture is stirred in a nitrogen atmosphere at normal pressure at 245° C. for 10 minutes, and then while the temperature is increased to 275° C. over 50 minutes the pressure of the reaction system of oligomer mixture is gradually reduced to 0.1 Torr.

(In the step of polycondensation) Polycondensation reaction is conducted at 275° C. at 0.1 Torr, and the mixture is polymerized until the intrinsic viscosity (IV) of the polyethylene terephthalate reaches 0.65 dl/g.

The polymerization time required in the step of polycondensation is determined as AP (min).

These procedures are conducted in a reaction unit in a batch system.

Production of a BHET mixture (in the step of producing BHET) is conducted in a known method. For example, terephthalic acid and ethylene glycol in the molar ratio of 1:2 are introduced into an autoclave in a batch system equipped with a stirrer, followed by esterification reaction at 245° C. at a pressure of 0.25 MPa while water is distilled away from the system.

By allowing the activity parameter AP to be within the range described above, the reaction rate is high enough to reduce the time for producing polyester by polycondensation. AP is preferably 1.5 T or less, more preferably 1.3 T or less, and most preferably 1.0 T or less.

(In the step of adding a catalyst), "a predetermined amount of a catalyst" means the amount of a catalyst which is varied depending on the activity of the catalyst, and the amount of a catalyst is low when the catalyst has a high activity, whereas the amount of a catalyst is high when the catalyst has a low activity. The amount of the catalyst used is up to 0.1 mol % as the aluminum compound relative to the number of moles of terephthalic acid. The catalyst added in an amount greater than 0.1 mol % is not practical because the residual amount in polyester is increased.

The PET resin chips used in measurement of TS, TOS, HS and Haze in the present invention are those prepared by rapid cooling thereof in a molten state after the steps 1) to 3) above. The resin chips used in this measurement are, for example, those in the form of a cylinder of approximately 3 mm in length and approximately 2 mm in diameter. The resin chips used in color measurement are substantially amorphous resin chips obtained by rapid cooling thereof in a molten state after the steps 1) to 3) above. The method of obtaining substantially amorphous resin chips includes e.g. a method wherein the polymer after melt polymerization is removed from the reaction system by discharging it through an outlet in the reaction system, immediately quenched with cold water, maintained in cold water for a sufficient time and cut into chips. The resin chips thus obtained are free of whitening resulting from crystallization and transparent in the outward appearance. The resin chips thus obtained are air-dried for approximately one day at room temperature on e.g. a filter paper and then measured for color. After the operation described above, the resin chips remain transparent in the outward appearance without undergoing whitening attributable to crystallization. In the resin chips for color measurement, additives (e.g. titanium dioxide) influencing the outward appearance shall not be used. The resin chips used in color measurement are, for example, those in the form of a cylinder of approximately 3 mm in length and approximately 2 mm in diameter.

Another aspect of the present invention is a polyester polymerization catalyst comprising at least one member selected from the group consisting of aluminum and compounds thereof as a first metal-containing component, characterized in that the hydrolytic stability parameter (HS) of polyethylene terephthalate (PET) polymerized by the catalyst satisfies the following formula (4):

$$HS<0.10 \tag{4}$$

wherein HS is a numerical value calculated in the formula $HS=0.245\{[IV]_{f2}^{-1.47}-[IV]_{i}^{-1.47}\}$, from the intrinsic viscosity ($[IV]_{f2}$) which is determined after melt-polymerized resin chips of PET having an initial IV ($[IV]_{i}$) of approximately 0.65 dl/g are frozen and milled to give powders of 20 meshes or less which are then vacuum-dried at 130° C. for 12 hours, and 1 g of the powders, together with 100 ml pure water, are placed in a beaker and then heated under stirring for 6 hours in a closed system at 130° C. under pressure.

The beaker used in measurement of HS is the one from which no acid or alkali is eluted. Specifically, use of a stainless steel beaker, a quartz beaker etc. is preferable.

By using the catalyst thus constituted, a polyester polymer giving molded articles excellent in hydrolytic stability can be obtained.

HS is more preferably 0.09 or less, particularly preferably 0.085 or less.

Another aspect of the present invention is a polyester polymerization catalyst comprising at least one member selected from the group consisting of aluminum and compounds thereof as a first metal-containing component, characterized in that the thermal oxidation stability parameter (TOS) of polyethylene terephthalate (PET) polymerized by the catalyst satisfies the following formula (3):

$$TOS<0.10 \tag{3}$$

wherein TOS is determined using the formula $TOS=0.245\{[IV]_{f1}^{-1.47}-[IV]_{i}^{-1.47}\}$, from IV which is determined after melt-polymerized resin chips of PET having an IV of approximately 0.65 dl/g are frozen and milled to give powders of 20 meshes or less which are then vacuum-dried at 130° C. for 12 hours, and 0.3 g of the powders are placed in a glass test tube and vacuum-dried at 70° C. for 12 hours and then heated at 230° C. for 15 minutes in dry air over silica gel.

$[IV]_i$ and $[IV]_{f1}$ refer to IV (dl/g) before and after the heating test respectively.

The method of heating in dry air over silica gel can be, for example, a method wherein a glass test tube is heated in air dried by connecting a dry tube containing silica gel to an upper part of the test tube.

By using the polyester polymerization catalyst constituted as described above, polyester which when formed into molded articles such as films and PET bottles, is excellent in heat aging resistance can be obtained.

TOS is more preferably 0.09 or less, further preferably 0.08 or less.

In the present invention described in claim 2, the hydrolytic stability parameter (HS) of said PET preferably satisfies the following formula (4):

$$HS<0.10 \tag{4}$$

By using the catalyst thus constituted, there can be obtained polyester which is excellent in melt thermal stability against heating melting in producing molded articles such as films, bottles and fibers and also superior in hydrolytic stability.

HS is preferably more 0.09 or less, further preferably 0.085 or less.

In the polyester polymerization catalyst described in claim 2, the thermal oxidation stability parameter (TOS) of said PET preferably satisfies the following formula (3):

$$TOS<0.10 \tag{3}$$

When TOS satisfies the formula (3), polyester which is also excellent in heat aging resistance when formed into molded articles such as films and hollow bottles can be obtained. TOS is more preferably 0.09 or less, further preferably 0.08 or less.

In the polyester polymerization catalyst described in claim 2, the solution haze of said PET preferably satisfies the following formula (5):

$$Haze<3.0(\%) \tag{5}$$

wherein the haze is measured after melt-polymerized resin chips of polyethylene terephthalate (PET) having an intrinsic viscosity of approximately 0.65 dl/g is dissolved in 3/1 mixed solvent (ratio by weight) of p-chlorophenol/1,1,2,2-tetrachloroethane to give 8 g/100 ml solution which is then measured by a haze meter. The haze was measured by charging the solution into a cell of 1 cm in length.

By this constitution, the catalyst gives polyester which is also excellent in transparency when formed into molded articles such as films and hollow bottles. Haze is more preferably 2.0 or less, further preferably 1.0 or less.

In the polyester polymerization catalyst described in claim 2, the color delta b parameter ($\Delta b$) of said PET preferably satisfies the following formula (6):

$$\Delta b<4.0 \tag{6}$$

wherein $\Delta b$ is a value obtained by subtracting the b value of PET produced by antimony trioxide as a catalyst from the Hunter's b value, measured by a color difference meter, of polyethylene terephthalate (PET) resin chips having an intrinsic viscosity of approximately 0.65 dl/g which were melt-polymerized by a predetermined catalyst. Antimony trioxide is added in an amount of 0.05 mol % in terms of antimony atom relative to the acid component in the polyethylene terephthalate formed.

As antimony trioxide, antimony trioxide having 99% or more purity, for example commercial Antimony (III) oxide (a product of Aldrich Chemical, 99.999% purity) is used.

By this constitution, the catalyst gives polyester which is also excellent in color tone when formed into melt-molded articles. The $\Delta b$ value is more preferably 3.0 or less, further preferably 2.5 or less.

Another polyester polymerization catalyst of the present invention comprises at least one member selected from the group consisting of aluminum and compounds thereof as a first metal-containing component, is characterized in that the color delta Lg parameter ($\Delta Lg$) and color delta bg parameter ($\Delta bg$) of polyethylene terephthalate polymerized by the catalyst satisfy the following relations (7) and (8) respectively:

$$\Delta Lg>-2.0 \tag{7}$$

wherein $\Delta Lg$ is a value obtained by subtracting the L value of PET produced by germanium dioxide as a catalyst from the Hunter's L value, measured by a color difference meter, of PET resin chips having an intrinsic viscosity of approximately 0.65 dl/g which were melt-polymerized by a predetermined amount of a catalyst. Germanium dioxide is added in an amount of 0.03 mol % in terms of germanium atom relative to the acid component in the polyethylene terephthalate formed, $$\Delta bg<4.5 \tag{8}$$

wherein $\Delta bg$ is a value obtained by subtracting the b value of PET produced by germanium dioxide as a catalyst from the Hunter's b value, measured by a color difference meter, of PET resin chips having an intrinsic viscosity of approximately 0.65 dl/g which were melt-polymerized by a predetermined amount of a catalyst. Germanium dioxide is added in an amount of 0.03 mol % in terms of germanium atom relative to the acid component in the polyethylene terephthalate formed.

In measurement of $\Delta Lg$ and $\Delta bg$, PET produced by using germanium dioxide having 97% or more purity (e.g. a commercial product produced by Jemco Ltd.) as the catalyst is measured for its L value and b value.

The polyester polymerization catalyst described above excludes an antimony or germanium compound as a major catalytic component, comprises aluminum as a major metal component, and gives polyester excellence in color tone when formed into melt-molded articles such as films and bottles.

The resin chips used in color measurement are substantially amorphous resin chips obtained by rapid cooling thereof in a molten state. The method of obtaining substantially amorphous resin chips includes e.g. a method wherein the polymer after melt polymerization is removed from the reaction system by discharging it through an outlet in the reaction system, immediately quenched with cold water, maintained in cold water for a sufficient time and cut into chips. The resin chips thus obtained are free of whitening resulting from crystallization and transparent in the outward appearance. The resin chips thus obtained are air-dried for approximately one day at room temperature on e.g. a filter paper and then measured for color. After the operation described above, the resin chips remain transparent in the outward appearance without undergoing whitening attributable to crystallization. In the resin chips for color measurement, additives (e.g. titanium dioxide) influencing the outward appearance shall not be used. $\Delta Lg$ is more preferably -1.0 or more, particularly preferably -0.0 or more. $\Delta bg$ is more preferably 4.0 or less, particularly preferably 3.5 or less.

In the present invention described above, the activity parameter (AP) preferably satisfies the following formula (2):

$$AP\text{ (min)}<2\ T\text{ (min)} \tag{2}$$

By allowing the activity parameter AP to be within the range described above, the polyester can be produced in a shorter time by polycondensation because of a higher reaction rate. AP is more preferably 1.5 T or less, further preferably 1.3 T or less, particularly preferably 1.0 T or less.

The catalyst described above is preferably free of alkali metals, alkaline earth metals or compounds thereof.

In a preferable embodiment of the present invention, at least one member selected from alkali metals, alkaline earth metals and compounds thereof is allowed to be coexistent in a small amount as a second metal-containing component in addition to aluminum or a compound thereof. The secondary metal-containing component is allowed to be coexistent in the catalyst system in order to improve not only the effect of inhibiting formation of diethylene glycol but also the catalytic activity thus providing a catalytic component for increasing the reaction rate to improve productivity effectively.

The technique of adding an alkali metal compound or an alkaline earth metal compound to an aluminum compound to form a catalyst having a sufficient catalytic activity is known. When such known catalyst is used, polyester which is excellent in thermal stability can be obtained, but the known catalyst using an alkali metal compound or an alkaline earth metal compound in combination with an aluminum compound should be added in a larger amount in order to achieve a practical catalytic activity, and use of the alkali metal compound causes an increase in the amount of insoluble particle attributable to the alkali metal, and use of the alkali metal compound in producing fibers causes a deterioration in spinnability and yarn physical properties, while use thereof for producing films causes a deterioration in film physical properties, transparency, thermal stability, thermal oxidation stability and hydrolytic stability. Further, the color tone of melt-molded articles such as fibers and films is degraded. When the alkaline earth metal compound is used in combination, a practical activity cannot be achieved without deteriorating the thermal stability and thermal oxidation stability of the resultant polyester, while discoloration occurs upon heating, and the amount of insoluble particle is increased.

When an alkali metal, an alkaline earth metal and compounds thereof are added, the amount M (mol %) thereof is preferably in the range of $1 \times 10^{-6}$ to 0.1 mol %, more preferably $5 \times 10^{-6}$ to 0.05 mol %, further preferably $1 \times 10^{-5}$ to 0.03 mol %, and most preferably $1 \times 10^{-5}$ to 0.01 mol %, relative to the number of moles of the whole polycarboxylic acid units constituting the polyester. The amount of the alkali metal and alkaline earth metal added is so small that the rate of reaction can be increased without causing problems such as a reduction in thermal stability, formation of insoluble particle, and discoloration. Further, the rate of reaction can be increased without causing problems such as a reduction in hydrolytic stability. When the amount M of an alkali metal, an alkaline earth metal and compounds thereof is 0.1 mol % or more, a reduction in thermal stability, formation of insoluble particle, an increase in discoloration and a reduction in hydrolytic stability can be problematic in manufacturing of products. When M is less than $1 \times 10^{-6}$ mol %, the effect of the metal added is not evident.

In the above-described catalyst, preferably a phosphorus compound is allowed to be coexistent, and the phosphorus compound allowed to be coexistent is preferably at least one member selected from the group consisting of phosphonate type compounds. Among these compounds, a compound having an aromatic ring structure is preferably used. It is particularly preferable that at least one member selected from the phosphonate type compounds represented by the following general formulae (1) and (2) is allowed to be coexistent:

   (1)

wherein $R^1$ and $R^2$ independently represent a hydrogen atom, an alkyl group and an aryl group containing 1 to 50 carbon atoms; and

   (2)

wherein $R^3$ and $R^4$ independently represent a hydrogen atom, an alkyl group and an aryl group containing 1 to 50 carbon atoms.

The compound represented by formula (1) or (2) above is preferably a compound having at least one aryl group because this compound is hardly distilled away to the outside of the system during polymerization reaction, thus achieving a higher effect thereof. The phosphorus compound having at least one aryl group is preferably at least one member selected from dimethyl phenylphosphonate and diphenyl methylphosphonate, and use of dimethyl phenylphosphonate is particularly preferable.

Generally, phosphorus compounds were well known as antioxidants, but even if these phosphorous compounds are used in combination with conventional metal-containing polyester polymerization catalysts, their significant promotion of melt polymerization is not known. Even if the phosphorus compound is added actually for the melt polymerization of polyester by a typical polyester polymerization catalyst such as an antimony compound, titanium compound, tin compound or germanium compound, it cannot be recognized that the polymerization is promoted to substantially useful levels.

The amount of the phosphorus compound used in the present invention is preferably 0.0001 to 0.1 mol %, more preferably 0.005 to 0.05 mol % relative to the number of moles of the whole constituent units of polycarboxylic acid components in the resulting polyester.

By simultaneously using the phosphorus compound in the present invention, the resulting catalyst can exhibit a sufficient catalytic effect even if the amount of aluminum added to the polyester polymerization catalyst is small. When the amount of the phosphorus compound added is less than 0.0001 mol %, the effect of the compound added may not be exhibited, when the compound is added in an amount of higher than 0.1 mol %, the catalytic activity of the polyester polymerization catalyst may be lowered, and this lowering tendency is varied depending on e.g. the amount of aluminum used.

There is a technique of preventing discoloration resulting from a reduction in thermal stability in case an aluminum compound is used as a catalyst, which comprises reducing the amount of the aluminum compound used and further adding a cobalt compound, but when the cobalt compound is added at a certain degree to achieve a sufficient catalytic activity, the thermal stability is lowered. Accordingly, this technique hardly meets both the conditions. Further, when the cobalt compound is added at such a degree as to have a sufficient catalytic activity or to prevent yellow discoloration, the resultant polyester polymer is gray discolored to lower the brightness of the polymer so that when used in films or hollow bottles, the polymer causes the problem of a deterioration of color tone when formed into molded articles. Further, when the cobalt compound is added at such a degree as to have a sufficient catalytic activity, there arises a problem that the hydrolytic stability of the resultant polyester polymer is lowered.

By using the phosphorus compound according to the present invention, there can be obtained a polyester polymerization catalyst causing none of such problems as a reduction in at least one of thermal stability, thermal oxidation stability and hydrolytic stability, as well as formation of insoluble particle and/or a reduction in color tone, and having a sufficient catalytic effect even if the amount of aluminum in the first metal-containing component is low, and this polyester polymerization catalyst can be used to solve the problem of at least one of thermal stability, heat aging resistance, water resistance, color tone and insoluble particle of polyester films, hollow molded articles such as bottles, fibers, and engineering plastics during melt molding.

Addition of phosphoric acid or a phosphate such as trimethyl phosphate in place of the phosphorus compound used preferably in the present invention is not practical because there does not bring approximately any effect of the compound added. Further, even if the phosphorus compound of the present invention in the amount defined in the present invention is used in combination with a conventional metal-containing polyester polymerization catalyst such as antimony compound, titanium compound, tin compound or germanium compound, there does not bring approximately any effect of promoting the melt polymerization reaction. Even if the phosphorus compound of the present invention is used singly in the range of the amount defined in the present invention, no catalytic activity is recognized.

BEST MODE FOR CARRYING OUT THE PRESENT INVENTION.

As aluminum or aluminum compounds constituting the polycondensation catalyst of the present invention, it is possible to use not only metal aluminum but also known aluminum compounds without limitation.

Specifically, the aluminum compounds include carboxylates such as aluminum formate, aluminum acetate, basic aluminum acetate, aluminum propionate, aluminum oxalate, aluminum acrylate, aluminum laurate, aluminum stearate, aluminum benzoate, aluminum trichloroacetate, aluminum lactate, aluminum citrate and aluminum salicylate, inorganic acid salts such as aluminum chloride, aluminum hydroxide, aluminum hydroxide chloride, aluminum carbonate, aluminum phosphate and aluminum phosphonate, aluminum alkoxides such as aluminum methoxide, aluminum ethoxide, aluminum n-propoxide, aluminum iso-propoxide, aluminum n-butoxide and aluminum t-butoxide, aluminum chelate compounds such as aluminum acetylacetonate, aluminum acetylacetate, aluminum ethylacetoacetate, aluminum ethylacetoacetate di-iso-propoxide, organoaluminum compounds such as trimethyl aluminum and triethyl aluminum, and partial hydrolyzates thereof and aluminum oxides. Among these, the carboxylates, inorganic acid salts and chelate compounds are preferable, among which aluminum acetate, aluminum chloride, aluminum hydroxide, aluminum hydroxide chloride and aluminum acetylacetonate are particularly preferable.

The amount of the aluminum compound used is preferably 0.001 to 0.05 mol %, more preferably 0.005 to 0.02 mol %, relative to the number of moles of the whole constituent units of carboxylic acid components such as dicarboxylic acids and polyvalent carboxylic acids in the resultant polyester. A distinctive feature of the polymerization catalyst of the present invention is that the catalyst exhibits a significant catalytic activity even in a small amount of the aluminum metal component and alkali metal component added. As a result, the resultant polyester polymerization catalyst can give polyester excellent in thermal stability while preventing formation of insoluble particle, and the polyester satisfies Haze<3.0 and TS<0.3. Further, this polyester polymerization catalyst can be used to produce polyester which is superior in thermal oxidation stability, hydrolytic resistance and color tone.

An alkali metal or alkaline earth metal constituting the secondary metal-containing component which is used preferably in addition to aluminum or a compound thereof in the present invention is preferably at least one member selected from Li, Na, K, Rb, Cs, Be, Mg, Ca, Sr and Ba, and an alkali metal or a compound thereof is used more preferably. When the alkali metal or a compound thereof is used, use of Li, Na or K is particularly preferable. The alkali metal or alkaline earth metal compounds include salts of these metals, for example saturated aliphatic carboxylates such as formate, acetate, propionate, butyrate and oxalate, unsaturated aliphatic carboxylates such as acrylate and methacrylate, aromatic carboxylates such as benzoate, halogen-containing carboxylates such as trichloroacetate, hydroxy carboxylates such as lactate, citrate and salicylate, inorganic acid salts such as carbonate, sulfate, nitrate, phosphate, phosphonate, hydrogen carbonate, hydrogen phosphate, hydrogen sulfide, sulfite, thiosulfate, hydrochloride, hydrobromate, chlorate and bromate, organic sulfonates such as 1-propane sulfonate, 1-pentane sulfonate and naphthalene sulfonate, organic sulfates such as lauryl sulfate, alkoxides such as methoxy, ethoxy, n-propoxy, iso-propoxy, n-butoxy and tert-butoxy, chelate compounds such as acetyl acetonate, hydrides, oxides and hydroxides.

When use is made of highly alkaline compounds such as hydroxides among these alkali metals, alkaline earth metals or compounds thereof, they tend to be hardly dissolved in organic solvents, for example diols such as ethylene glycol or alcohols, so they should be added as an aqueous solution to the polymerization system, which may be problematic in the polymerization process. Further, when highly alkaline compounds such as hydroxides are used, the polyester easily undergoes side reactions such as hydrolysis during polymerization, while the polymerized polyester is easily discolored and hydrolytic stability also tends to be lowered. Accordingly, preferable examples of the alkali metals or compounds thereof or alkaline earth metals or compounds thereof in the present invention are alkali metal salts or alkaline earth metal salts selected from saturated aliphatic carboxylate, unsaturated aliphatic carboxylate, aromatic carboxylate, halogen-containing carboxylate, hydroxy carboxylate, sulfate, nitrate, phosphate, phosphonate, hydrogen phosphate, hydrogen sulfide, sulfite, thiosulfate, hydrochloride, hydrobromate, chlorate and bromate, organic sulfonates, organic sulfates, chelate compounds and oxides. Among these, alkaline metal or alkaline earth metal saturated aliphatic carboxylates particularly acetates are preferably used from the viewpoint of easy handling and easy availability.

In a preferable embodiment, a cobalt compound is further added to the polyester polymerization catalyst of the present invention in an amount of less than 10 ppm in terms of cobalt atom relative to polyester.

It is known that the cobalt compound itself has a polymerization activity at a certain degree, but when it is added in such an amount as to exhibit a sufficient catalytic effect, the brightness or thermal stability of the resultant polyester polymer is lowered. The polyester obtained in the present invention is excellent in color tone and thermal stability, and by adding the cobalt compound in such a small amount that the catalytic effect thereof is not evident, the discoloration of the resultant polyester can be effectively diminished without causing a reduction in the brightness of the polyester. The object of the cobalt compound in the present invention is to diminish discoloration, and the cobalt compound may be added at any stage of polymerization or after polymerization reaction.

Production of polyester according to the present invention can be carried out in the same manner as in the conventional process except that the polyester polymerization catalyst of the present invention is used as the catalyst. For example, the method of polymerizing PET may be either a method of esterifying terephthalic acid with ethylene glycol followed by polycondensation thereof or a method of transesterification reaction of alkyl terephthalate such as dimethyl terephthalate with ethylene glycol followed by polycondensation thereof. The apparatus for polymerization may be in a batch or continuous system.

The catalyst of the present invention has a catalytic activity not only in polymerization reaction but also in esterification reaction and transesterification reaction. For example, the polymerization of alkyl dicarboxylate such as dimethyl terephthalate and glycol such as ethylene glycol by transesterification reaction is conducted usually in the presence of an transesterification catalyst such as a titanium compound or a zinc compound, but the catalyst of the present invention can also be used in place of such catalyst or in the coexistence of such catalyst. Further, the catalyst of the present invention also has a catalytic activity not only in melt polymerization but also in solid phase polymerization and solution polymerization, and in any methods, polyester can be produced.

The polycondensation catalyst of the present invention can be added to the reaction system at an arbitrary stage of the polymerization reaction. For example, the catalyst can be added to the reaction system before or during esterification reaction or transesterification reaction or just before or during polycondensation reaction. In particular, aluminum or a compound thereof is added preferably just before polycondensation reaction.

The method of adding the polycondensation catalyst of the present invention is not particularly limited, and the catalyst may be added in a powdery or neat state or in the form of a solution or slurry in a solvent such as ethylene glycol. Alternatively, an aluminum metal or a compound thereof and another component, preferably the phosphorus compound in the present invention, may be added as a mixture or complex, or these components may be added separately. Alternatively, an aluminum metal or a compound thereof and another component, preferably the phosphorus compound in the present invention, may be added to the polymerization system at the same stage, or these components may be added at different stages.

To improve the productivity of polyester by shortening the polymerization time, the polycondensation catalyst of the present invention may be used preferably in the coexistence of another polycondensation catalyst such as an antimony compound, a germanium compound or a titanium compound in such an amount as not to cause the above problems in the properties, processability and color tone of polyester products.

In this case, the antimony compound can be added in an amount of 50 ppm or less in terms of antimony atom relative to the polyester obtained by polymerization. The antimony compound is added more preferably in an amount of 30 ppm or less. An amount of antimony greater than 50 ppm is not preferable because an antimony metal is precipitated to cause gray discoloration or to generate insoluble particle in the polyester.

The germanium compound can be added in an amount of 20 ppm or less in terms of germanium atom in the polyester obtained by polymerization. The germanium compound is added more preferably in an amount of 10 ppm or less. An amount of germanium greater than 20 ppm is economically disadvantageous and thus not preferable.

Preferable examples of the antimony compound which can be added include antimony trioxide, antimony pentaoxide, antimony acetate, antimony glucoxide etc., among which antimony trioxide is preferably used. The germanium compound includes germanium dioxide, germanium tetrachloride etc., among which germanium dioxide is preferable.

Other polymerization catalysts such as titanium compound and tin compound include tetra-n-propyl titanate, tetra-isopropyl titanate, tetra-n-butyl titanate, tetra-isobutyl titanate, tetra-tert-butyl titanate, tetra-cyclohexyl titanate, tetra-phenyl titanate and tetrabenzyl titanate, among which tetrabutyl titanate is preferably used. The tin compound includes dibutyltin oxide, methylphenyltin oxide, tetraethyl tin, hexaethylditin oxide, triethyltin hydroxide, monobutyl hydroxytin oxide, triisobutyltin acetate, diphenyltin dilaurate, monobutyltin trichloride, dibutyltin sulfide, dibutyl hydroxytin oxide, methylstannic acid, ethyl stannate etc., among which monobutyl hydroxytin oxide is preferably used.

The polyester in the present invention refers to polyester comprising one or more members selected from polyvalent carboxylic acids including dicarboxylic acids and ester-forming derivatives thereof and one or more members selected from polyvalent alcohols including glycols, to polyester comprising one or more members selected form hydroxycarboxylic acids and ester-forming derivatives thereof, or to polyester comprising cyclic esters.

The dicarboxylic acids include saturated aliphatic dicarboxylic acids such as oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid and dimer acid or ester-forming derivatives thereof, unsaturated aliphatic dicarboxylic acid such as fumaric acid, maleic acid and itaconic acid or ester-forming derivatives thereof, and aromatic dicarboxylic acids such as orthophthalic acid, isophthalic acid, terephthalic acid, diphenine acid, 1,3-naphthalene dicarboxylic acid, 1,4-naphthalene dicarboxylic acid, 1,5-naphthalene dicarboxylic acid, 2,6-naphthalene dicarboxylic acid, 2,7-naphthalene dicarboxylic acid, 4,4'-biphenyl dicarboxylic acid, 4,4'-biphenyl sulfone dicarboxylic acid, 4,4'-biphenyl ether dicarboxylic acid, 1,2'-bis(phenoxy) ethane-p,p'-dicarboxylic acid, pamoinic [phonetic trans.] acid and anthracene dicarboxylic acid or ester-forming derivatives thereof.

Among these dicarboxylic acids, terephthalic acid, isophthalic acid and naphthalene dicarboxylic acid are particularly preferable for the physical properties of the resultant polyester, and if necessary other dicarboxylic acids are used as constituent components.

The polyvalent carboxylic acids other than these dicarboxylic acids include ethane tricarboxylic acid, propane tricarboxylic acid, butane tetracarboxylic acid, pyromellitic acid, trimellitic acid, trimesic acid, 3,4,3',4'-biphenyl tetracarboxylic acid and ester-forming derivatives thereof.

The glycols include aliphatic glycols such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cylohexane diol, 1,3-cylohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol, polyethylene glycol, polytrimethylene glycol and polytetramethylene glycol, and aromatic glycols such as hydroquinone, 4,4-dihydroxybisphenol, 1,4-bis(β-hydroxyethoxy) benzene, 1,4-bis(β-hydroxyphenyl) sulfone, bis(p-hydroxyphenyl) ether, bis(p-hydroxyphenyl) sulfone, bis(p-hydroxyphenyl) methane, 1,2-bis(p-hydroxyphenyl) ethane, bisphenol A, bisphenol C, 2,5-naphthalene diol, and glycols having ethylene oxide added to these glycols.

Among these glycols, ethylene glycol, 1,3-propylene glycol, 1,4-butylene glycol and 1,4-cyclohexane dimethanol are particularly preferably used as major components.

The polyvalent alcohols other than these glycols include trimethylol methane, trimethylol ethane, trimethylol propane, pentaerythritol, glycerol, and hexane triol.

The hydroxycarboxylic acids include lactic acid, citric acid, malic acid, tartaric acid, hydroxyacetic acid, 3-hydroxybutyric acid, p-hydroxybenzoic acid, p-(2-hydroxyethoxy) benzoic acid, 4-hydroxycyclohexane carboxylic acid or ester-forming derivatives thereof.

The cyclic esters include ε-caprolactone, β-propiolactone, β-methyl-β-propiolactone, δ-valerolactone, glycolide and lactide.

The ester-forming derivatives of polyvalent carboxylic acids or hydroxycarboxylic acids include alkyl esters, acid chlorides and acid anhydrides thereof.

The polyester preferably used in the present invention is polyester whose major acid component is terephthalic acid or an ester-forming derivative thereof or naphthalene dicarboxylic acid or an ester-forming derivative thereof, preferably polyester whose major glycol component is an alkylene glycol.

The polyester whose major acid component is terephthalic acid or an ester-forming derivative thereof is polyester wherein the total content of terephthalic acid or an ester-forming derivative is preferably 70 mol % or more, more preferably 80 mol % or more and most preferably 90 mol % or more, relative to the whole acid components. The polyester whose major acid component is naphthalene dicarboxylic acid or an ester-forming derivative thereof is polyester wherein the total content of naphthalene dicarboxylic acid or an ester-forming derivative is preferably 70 mol % or more, more preferably 80 mol % or more and most preferably 90 mol % or more, relative to the whole acid components.

The polyester whose major glycol component is an alkylene glycol is polyester wherein the total content of the alkylene glycol is preferably 70 mol % ore more, more preferably 80 mol % or more and most preferably 90 mol % or more, relative to the whole glycol components. As used herein, the alkylene glycol may contain a substituent group or an alicyclic structure in the molecule chain thereof.

The naphthalene dicarboxylic acid or ester-forming derivatives thereof used in the present invention are preferably those exemplified above as the dicarboxylic acids, that is, 1,3-naphthalene dicarboxylic acid, 1,4-naphthalene dicarboxylic acid, 1,5-naphthalene dicarboxylic acid, 2,6-naphthalene dicarboxylic acid or 2,7-naphthalene dicarboxylic acid, or ester-forming derivatives thereof.

As the alkylene glycol preferably used in the present invention, it is preferable to use those exemplified above as glycols, that is, ethylene glycol, 1,2-propylene glycol, 1,3-propylene glycol, 1,2-butylene glycol, 1,3-butylene glycol, 2,3-butylene glycol, 1,4-butylene glycol, 1,5-pentane diol, neopentyl glycol, 1,6-hexane diol, 1,2-cyclohexane diol, 1,3-cyclohexane diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol etc. Two or more of these compounds may be simultaneously used.

The polyester of the present invention can also contain a known phosphorus compound as a copolymerizable component. The phosphorus compound is preferably a bifunctional phosphorus type compound such as, for example, (2-carboxyethyl) methylphosphinic acid, (2-carboxyethyl) phenylphosphinic acid, and 9,10-dihydro-10-oxa-(2,3-carboxypropyl)-10-phosphaphenanthrene-10-oxide. These phosphorus type compounds can be contained as copolymerizable components to improve e.g. the flame retardancy of the resultant polyester.

In a preferable embodiment, polycarboxylic acids having an alkali metal sulfonate base are used as copolymerizable components of the polyester in the present invention in order to improve dyeing properties when the polyester is used as fibers.

The metal sulfonate group-containing compound used as a copolymerizable monomer includes, but is not limited to, 5-sodium sulfoisophthalic acid, 2-sodium sulfoterephthalic acid, 5-lithium sulfoisophthalic acid, 2-lithium sulfoterephthalic acid, 5-potassium sulfoisophthalic acid and 2-potassium sulfoterephthalic acid or lower alkyl ester derivatives thereof. In the present invention, 5-sodium sulfoisophthalic acid or ester-forming derivatives thereof are preferably used.

The amount of the metal sulfonate-group containing compound copolymerized is preferably 0.3 to 10.0 mol %, more preferably 0.80 to 5.0 mol %, relative to the acid components constituting the polyester. When the amount of the compound copolymerized is too low, the resultant polyester is inferior in dyeability with cationic dyes, and when the amount of the compound copolymerized is too high, fibers produced from the resultant polyester may be inferior in fiber productivity and may fail to achieve sufficient strength due to the phenomenon of thickening in viscosity. Further, when the metal sulfonate-containing compound is copolymerized in an amount of 2.0 mol % or more, the resultant modified polyester fibers can also be endowed with dyeability at normal pressure. By selecting suitable easily dyeable monomers, the amount of the metal sulfonate group-containing compound used can be suitably reduced. The easily dyeable monomers include, but are not limited to, long-chain glycol compounds such as polyethylene glycol, polytetraethylene glycol and aliphatic dicarboxylic acids such as adipic acid, sebacic acid and azelaic acid.

Preferable examples of the polyester produced by using the polyester polymerization catalyst in the present invention include polyethylene terephthalate, polybutylene terephthalate, polypropylene terephthalate, poly(1,4-cyclohexane dimethylene terephthalate), polyethylene naphthalate, polybutylene naphthalate, polypropylene naphthalate and copolymers thereof, among which particularly preferably polymers are polyethylene terephthalate and copolymers thereof.

After the polyester is polymerized according to the process of the present invention, the thermal stability of the polyester can be further improved by removing the catalyst from the polyester or by adding a phosphorus type compound to inactivate the catalyst.

The polyester in the present invention can contain organic, inorganic and organometallic toners and a optical brightener, and by incorporation of one or more of these additives, discoloration such as yellow discoloration of polyester can be inhibited to a lower level. The polyester may contain other arbitrary polymers, antistatic agents, antifoaming agents, dyeing improvers, dyes, pigments, delusterants, optical brighteners, stabilizers, antioxidants and other additives. As the antioxidant, antioxidants of aromatic amine type or phenol type or etc. can be used, and as the stabilizers, stabilizers of phosphorus type such as phosphoric acid and phosphate or stabilizers of sulfur or amine type or etc. can be used.

EXAMPLES

Hereinafter, the constitution and effect of the present invention are described in more detail by reference to the Examples, which are not intended to limit the present invention.

Evaluation Methods

Intrinsic Viscosity (IV)

Polyester was dissolved in a mixed solvent of phenol/1,1,2,2-tetrachloroethane in a ratio of 6/4 (by weight ratio) and measured at a temperature of 30° C.

Thermal Stability Parameter (TS)

TS was determined as follows: 1 g of melt-polymerized PET resin chips having an IV of approximately 0.65 dl/g (before the melting test; $[IV]_i$) were placed in a glass test tube having an internal diameter of approximately 14 mm and then vacuum-dried at 130° C. for 12 hours, and the glass test tube was connected to a vacuum line where the replacement of the atmosphere by nitrogen was conducted five or more times by introducing nitrogen under reduced pressure, to achieve a nitrogen atmosphere at 100 Torr in the glass test tube which was then sealed. This test tube was immersed in a salt bath at 300° C. and maintained for 2 hours in a molten state, and the sample was removed, frozen and milled, and vacuum-dried to determine the IV (after the melting test; $[IV]_f$). From the $[IV]_f$, TS was calculated using the formula below. The formula is from a previous report (Kamiyama et al.: Journal of Society of Rubber Industry, Japan, vol. 63, no. 8, p. 497, 1990).

$$TS=0.245\{[IV]_f^{-1.47}-[IV]_i^{-1.47}\}$$

Hydrolytic Stability Parameter (HS)

Melt-polymerized PET resin chips having an intrinsic viscosity of approximately 0.65 dl/g (before the test; $[IV]_i$) were frozen and milled in a usual manner to give powder of 20 meshes or less which were then dried at 130° C. for 12 hours. A hydrolysis test was conducted using a mini-color unit (Type M12. ELB, manufactured by Texam Giken Co., Ltd.). 1 g of the powders, together with 100 ml pure water, were placed in a special stainless steel beaker, and a special stirring blade was added to it, and in a closed system, the beaker was set in the mini-color unit and stirred under heating at 130° C. under pressure for 6 hours. After the test, the PET was collected on a glass filter, vacuum-dried and then measured for the IV ($[IV]_{f2}$), to determine the hydrolytic stability parameter (HS) by using the formula below.

Freezing and milling was conducted using a freezer mill (6750 model, US Spex Inc.). Approximately 2 g resin chips and a special impactor were placed in a special cell, and the cell was set in the mill, and liquid nitrogen was introduced into the mill and maintained for approximately 10 minutes, and the sample was then milled for 5 minutes at a rate of 10 (at which the impactor was inverted approximately 20 times per second).

$$HS=0.245\{[IV]_{f2}^{-1.47}-[IV]_i^{-1.47}\}$$

Thermal Oxidation Stability Parameter (TOS)

Melt-polymerized PET resin chips having an IV of approximately 0.65 dl/g were frozen and milled in the same manner as in measurement of HS, to give powders of 20 meshes or less. The powders were vacuum-dried at 130° C. for 12 hours, and 0.3 g of the powders were placed in a glass test tube of an inner diameter of approximately 8 mm and approximately 140 mm in length, vacuum-dried at 70° C. for 12 hours, and heated at 230° C. for 15 minutes in air dried by connecting a dry tube containing silica gel to an upper part of the test tube immersed in a salt bath. From the IV of the PET after the heating test, TOS was determined according to the same formula below as for TS above. In the formula, $[IV]_i$ and $[IV]_{f1}$ refer to IV (dl/g) before and after the heating test respectively.

$$TOS=0.245\{[IV]_{f1}^{-1.47}-[IV]_i^{-1.47}\}$$

Solution Haze (Haze)

Melt-polymerized PET resin chips having an IV of approximately 0.65 dl/g were dissolved in a mixed solvent of p-chlorophenol/1,1,2,2-tetrachloroethane in 3/1 (by weight ratio) to give 8 g/100 ml solution which was then measured at room temperature by a turbidity meter model NDH2000 manufactured by Nippon Denshoku Co., Ltd. In this measurement, diffused transmitted light (DF) and total transmitted light (TT) in the solution were measured by a cell of 1 cm in length according to JIS standards JIS-K7105, and the haze (%) was determined according to the following formula:

$$Haze(\%)=(DF/TT)\times 100$$

Color Delta b Parameter (Δb)

When PET in melt polymerization reached predetermined stirring torque, the autoclave was flushed with nitrogen and returned to normal pressure to terminate the polycondensation reaction. Thereafter, the polymer was quenched under slight pressure by discharging it in a strand form into cold water and cut into cylindrical PET resin chips of approximately 3 mm in length and approximately 2 mm in diameter after maintaining under the cool water approximetly 20 seconds. The resin chips thus obtained were air-dried for approximately one day on a filter paper at room temperature and used in color measurement.

The PET resin chips having an IV of approximately 0.65 dl/g obtained in the manner described above were measured for Hunter's b value by a color difference meter Model TC-1500MC-88 (Tokyo Denshoku Co., Ltd.), and the color delta b parameter (Δb) was determined by subtracting, from the Hunter's b value, the b value of PET polymerized by using antimony trioxide in an amount of 0.05 mol % in terms of antimony atom relative to the acid component in the PET.

Color Delta Lg Parameter (ΔLg)

PET resin chips having an IV of approximately 0.65 dl/g, obtained by the same melt polymerization as for measurement in 6) color delta b parameter above, were measured for Hunter's L value by a color difference meter Model TC-1500MC-88 (Tokyo Denshoku Co., Ltd.), and the color delta Lg parameter was determined by subtracting, from the Hunter's L value, the L value of PET polymerized by using germanium dioxide in an amount of 0.03 mol % in terms of germanium atom relative to the acid component in the PET.

Color Delta bg Parameter (Δbg)

PET resin chips having an IV of approximately 0.65 dl/g, obtained by the same melt polymerization as for measurement in 6) color delta b parameter above, were measured for Hunter's b value by a color difference meter Model TC-1500MC-88 (Tokyo Denshoku Co., Ltd.), and the color delta bg parameter was determined by subtracting, from the Hunter's b value, the b value of PET polymerized by using germanium dioxide in an amount of 0.03 mol % in terms of germanium atom relative to the acid component in the PET.
Thermal Stability of Film
Film Manufacturing PET resin chips obtained in melt polymerization in the Examples and Comparative Examples described later were vacuum-dried at 135° C. for 6 hours. Thereafter, the sample was fed to an extruder and melt-extruded at 280° C. in a sheet form, quenched and solidified on a metal roll kept at a surface temperature of 20° C., to give a cast film of 1400 μm in thickness.

Then, this cast film was heated at 100° C. with a series of heated rolls and an IR heater and then stretched 3.5-fold in the longer direction with a series of rolls different in circumferential velocity to give a monoaxially stretched PET film. Subsequently, the film was stretched 4.0-fold in the width direction by a tenter at 120° C., and while the width of the film was fixed, the film was heated at 260° C. for 0.5 second by an IR heater, followed by relaxation by 3% at 200° C. for 23 seconds, to give a biaxially stretched PET film of 100 μm in thickness.

Manufacture of a Film from Recovered Pellets

The PET film obtained by the method described in (i) above was cut into strips, vacuum-dried and introduced into an extruder, and the molten resin was extruded at a temperature set at 280° C. through a nozzle of 5 mm in diameter, cooled with water and cut to give recovered pellets.

The PET resin chips obtained in melt polymerization and the recovered pellets described above were mixed in the ratio of 50:50 by weight and vacuum-dried at 135° C. for 6 hours. Thereafter, the mixture was supplied to an extruder, melt-extruded at 280° C. in a sheet form and quenched on a metal roll kept at a surface temperature of 20° C., to give a cast film of 1400 μm in thickness.

Then, this cast film was heated at 100° C. with a series of heated rolls and an IR heater and then stretched 3.5-fold in the longer direction with a series of rolls different in circumferential velocity to give a monoaxially oriented PET film. Subsequently, the film was stretched 4.0-fold in the width direction by a tenter at 120° C., to give a biaxially oriented PET film of 100 μm in thickness.

Evaluation of Film Thermal Stability

The outward appearance of the resultant film was observed with naked eyes, and depending on the degree of discoloration of the film, the film was evaluated to be excellent when there was less discoloration.

Film Insoluble Particle

The film obtained in the method described in 9) (i) above was magnified under a microscope and observed with naked eyes, and the film was evaluated to be excellent when there was less insoluble particle.

Evaluation of Film Discoloration

The outward appearance of the film obtained in the method described in 9) (i) above was observed with naked eyes to evaluate the degree of discoloration. In the evaluation result, the film was evaluated to be excellent when there was less discoloration. (□, not discolored; ○, slightly discolored; Δ, discolored; and ×, significantly discolored)

Film Water Resistance

The film obtained in the method described in 9) (i) above was cut into test specimens of 8 cm in length and 4 cm in width, and the test specimen was boiled for 5 days in boiling water. After boiling, the film specimen was stretched in the lengthwise direction to evaluate its film resistance in terms of the degree of cutting.

Film Heat Aging Resistance

The film obtained in the method 9) (i) above was cut into test specimens of 10 cm in length and 5 cm in width, and the test specimen was treated at 200° C. for 100 hours in a gear hot-air oven and then stretched in the lengthwise direction, to evaluate its heat aging resistance in terms of the degree of cutting.

Film Color Tone

The several films obtained in the method in 9) (i) above were laminated and evaluated with naked eyes for the transmittance of white light. ○ was given to a laminate having high transmittance of white light, while × was given to a laminate having low transmittance.

Synthesis Example of Polyester

Example 1

To a mixture of bis(2-hydroxyethyl) terephthalate and oligomers produced in a usual manner from high-purity terephthalic acid and ethylene glycol were added 3 g/l aluminum acetylacetonate as a polycondensation catalyst in ethylene glycol in an amount of 0.01 mol % in terms of aluminum atom relative to the acid component in the polyester, 10 g/l dimethyl phenylphosphonate in ethylene glycol in an amount of 0.03 mol % in terms of dimethyl phenylphosphonate relative to the acid component, and 50 g/l lithium acetate.2H$_2$O in ethylene glycol in an amount of 0.03 mol % in terms of lithium atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polycondensation reaction was further conducted at 275° C. at 0.1 Torr. The polymerization time (AP) necessary for the IV of the polyethylene terephthalate to reach 0.65 dl/g is shown in Table 1. In the above method, the polyethylene terephthalate having an IV of 0.65 dl/g was polymerized and formed in a usual manner into chips. The PET resin chips were measured in a melt test to determine stability parameter (TS). After the melt test, the IV and TS are shown in Table 1.

Using the PET resin chips before the melt test, a film was manufactured, recovered pellets were prepared from the film, and a film was prepared from the recovered pellets. The evaluation results of the thermal stability and insoluble particle of the film are shown in Table 1.

The catalyst of the present invention had a high catalytic activity and the PET obtained using this catalyst was excellent in thermal stability evaluated in terms of TS and film thermal stability.

Comparative Examples 1 to 3

The same procedure as in Example 1 was conducted except that the catalyst was changed. The composition of the catalyst used, the polymerization time necessary for the IV of the PET to reach 0.65 dl/g, and the IV and TS after the melt test, are shown in Table 1. The amount of each component added is a value based on the acid component in PET. The amount of a metal compound added is expressed in terms of metal atom. Using the PET resin chips before the melt test, a film was manufactured, recovered pellets were prepared from the film, and a film was prepared from the recovered pellets. The evaluation results of the thermal stability and insoluble particle of the film are shown in Table 1.

The catalyst in Comparative Example 1 was poor in activity, required a long polymerization time and was inferior in film thermal stability with TS greater than 0.3. The catalyst in Comparative Example 2 could achieve polymerization in a shorter time by a higher activity than in Comparative Example 1, but was inferior to Comparative Example 1 in film thermal stability with higher TS. The catalyst in Comparative Example 3 had a higher activity than in Comparative Example 2, but inferior in film thermal stability with high TS.

Reference Example 1

The same procedure as in Example 1 was conducted except that as the catalyst, antimony trioxide was used in an amount of 0.05 mol % in terms of antimony atom relative to the acid component in PET. As antimony trioxide, commercial antimony (III) oxide (with 99.999% purity, from Aldrich Chemical) was used. The antimony trioxide was used in the form of a solution prepared by dissolving it at a concentration of approximately 10 g/l in ethylene glycol at 150° C. under stirring for approximately 1 hour.

As is evident from the Examples and Comparative Examples described above, the PET resin chips having stability parameter within the range described in the claims of the present invention are excellent in film thermal stability and film quality level and a product produced by reutilizing the scrap film thereof is also excellent in quality level. On the other hand, the PET resin chips outside of the claims of the present invention are inferior in film thermal stability, so the resultant film is inferior in quality level, and a product produced by reutilizing the scrap film thereof is also inferior in film quality level.

Example 2

To a mixture of bis(2-hydroxyethyl) terephthalate and oligomers produced in a usual manner from high-purity terephthalic acid and ethylene glycol were added 13 g/l aluminum chloride as a polycondensation catalyst in ethylene glycol in an amount of 0.015 mol % in terms of aluminum atom relative to the acid component in the polyester, 10 g/l dimethyl phenylphosphonate in ethylene glycol in an amount of 0.02 mol % in terms of dimethyl phenylphosphonate relative to the acid component, and 50 g/l lithium acetate.$2H_2O$ in ethylene glycol in an amount of 0.025 mol % in terms of lithium atom relative to the acid component, and the mixture was stirred at 245° C. for 10 minutes in a nitrogen atmosphere at normal pressure. Then, the temperature was increased to 275° C. over 50 minutes while the pressure in the reaction system was gradually reduced to 0.1 Torr, and the polycondensation reaction was further conducted at 275° C. at 0.1 Torr.

The polymerization time (AP) necessary for the IV of the polyethylene terephthalate to reach 0.65 dl/g was 70 minutes, indicating that the polycondensation catalyst had a practical polymerization activity.

The polyethylene terephthalate having an IV of 0.65 dl/g, obtained in the above polycondensation, was formed in a usual manner into chips. The PET resin chips were measured in a melt test to determine thermal stability parameter (TS). The IV after the melt test ($[IV]_{f1}$) was 0.52, and the TS was 0.18, indicating good thermal stability.

The PET resin thus chipped was milled in a usual manner to give powder which was then used in a hydrolysis test to determine hydrolytic stability parameter (HS). The IV after the hydrolysis test ($[IV]_{f2}$) was 0.58, and the HS was 0.08, indicating that the PET obtained by using the polycondensation catalyst of the present invention was also excellent in hydrolytic stability.

Using the PET resin chips obtained by melt polymerization, a film was manufactured, recovered pellets were prepared from the film, and a film was prepared from the recovered pellets. The evaluation result of the thermal stability of the film was good without discoloration in the film.

The evaluation result of the water resistance of the film prepared from the virgin PET resin chips obtained by melt polymerization indicated good water resistance with sufficient strength and less cutting.

Comparative Example 4

The same procedure as in Example 2 was conducted except that 13 g/l aluminum chloride was added as a polycondensation catalyst in ethylene glycol in an amount of 0.015 mol % in terms of aluminum atom relative to the acid component in the polyester and 50 g/l lithium acetate.$2H_2O$ in ethylene glycol was added in an amount of 0.05 mol % in terms of lithium atom relative to the acid component.

The polymerization time (AP) necessary for the IV of the PET to reach 0.65 dl/g was 62 minutes, indicating that the polycondensation catalyst had a practical catalytic activity. However, when the PET resin powder was used in a hydrolysis test, the intrinsic viscosity ($[IV]_{f2}$) after the hydrolysis test was 0.56, and the HS was 0.11, indicating that the hydrolytic resistance was not sufficient.

Using the PET resin chips obtained in the melt polymerization, a film was manufactured, recovered pellets were prepared from the film, and a film was prepared from the recovered pellets. The film obtained by using the virgin PET resin chips obtained in the melt polymerization was not satisfactory since the film was poor in water resistance and easily cut.

Comparative Example 5

The same procedure as in the Example was conducted except that 13 g/l aluminum chloride was added as a polycondensation catalyst in ethylene glycol in an amount of 0.015 mol % in terms of aluminum atom relative to the acid component in the polyester. The polymerization reaction was carried out for 180 minutes or more, but the intrinsic viscosity did not reach 0.65 dl/g.

The PET obtained in Reference Example 1 was also simultaneously examined, and as a result, $[IV]_{f1}$ was 0.50, $[IV]_{f2}$ was 0.61, the thermal stability parameter (TS) was 0.22, and the hydrolytic stability parameter (HS) was 0.05, indicating that these properties were good.

As described above, the PET resin having the thermal stability parameter (TS) and hydrolytic stability parameter (HS) within the range described in the claims of the present invention is excellent in film thermal stability and water resistance and superior in film quality level, and a product produced by reutilizing the scrap film thereof is also excellent in film quality level with less deterioration in strength even after contacted with water for a long time.

On the other hand, the PET resin outside of the claims of the present invention is poor in film quality level since the film is inferior in thermal stability and/or water resistance, and there is a problem that a film produced by reutilizing the scrap film thereof is also poor in quality level and/or a problem that the film when used in contact with water for a long time undergoes significant deterioration, thus deteriorating the value of the product.

Example 3

To a mixture of bis(2-hydroxyethyl) terephthalate and oligomers produced in a usual manner from high-purity terephthalic acid and ethylene glycol were added 13 g/l aluminum chloride as a polycondensation catalyst in ethylene glycol in an amount of 0.015 mol % in terms of aluminum atom relative to the acid component in the polyester, 10 g/l dimethyl phenylphosphonate in ethylene glycol in an amount of 0.03 mol % in terms of dimethyl phenylphosphonate relative to the acid component, and 50 g/l lithium acetate.$2H_2O$ in ethylene glycol in an amount of 0.025 mol % in terms of lithium atom relative to the acid component, in an electrical-wire heating 2-Liter stainless steel autoclave equipped with a stirrer, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa.

The polymerization time (AP) necessary for the IV of the polyethylene terephthalate to reach 0.65 dl/g was 79 minutes, indicating that the polycondensation catalyst had a practical polymerization activity.

The polyethylene terephthalate having an IV of 0.65 dl/g, obtained in the above polycondensation, was formed in a usual manner into chips. The PET resin chips were measured in a melt test to determine thermal stability parameter (TS). TS was 0.18, to indicate good thermal stability.

The PET resin chips were milled in a usual manner, and the resultant powder was examined in a heating test to determine thermal oxidation stability parameter (TOS). TOS was 0.07, indicating that the PET obtained by using the polycondensation catalyst of the present invention was also excellent in thermal oxidation stability.

Using the PET resin chips obtained in the melt polymerization, a film was manufactured, recovered pellets were prepared from the film, and a film was prepared from the recovered pellets by the methods described in 9) (i) and (ii). The evaluation result of the thermal stability of the film was good without discoloration in the film.

The evaluation result of the heat aging resistance of the film prepared from the virgin PET resin chips obtained by melt polymerization indicated good heat aging resistance with sufficient strength and less cutting.

Comparative Example 6

The same procedure as in Example 3 was conducted except that 13 g/l aluminum chloride was added as a catalyst in ethylene glycol in an amount of 0.015 mol % in terms of aluminum atom relative to the acid component in the polyester and 50 g/l lithium acetate.$2H_2O$ in ethylene glycol was added in an amount of 0.06 mol % in terms of lithium atom relative to the acid component.

In this example, AP was 62 minutes, but when a thermal oxidation stability test was conducted, TOS was 0.19, indicating insufficient thermal oxidation stability.

The evaluation result of the heat aging resistance of the film indicated that the film was poor in strength, easily cut and not satisfactory.

The PET obtained in Reference Example 1 was also simultaneously examined, and as a result, TOS was 0.01, indicating that this physical property was good.

As is evident from Example 3 and Comparative Example 6 described above, the PET resin having the thermal stability parameter (TS) and thermal oxidation stability parameter (TOS) within the range described in the claims of the present invention is excellent in film thermal stability and heat aging resistance and superior in film quality level, and a product produced by reutilizing the scrap film thereof is also excellent in quality level and in heat aging resistance for a long time.

On the other hand, the PET resin outside of the claims of the present invention is poor in film quality level since the film is inferior in thermal stability and/or thermal oxidation stability, and there is a problem that a film produced by reutilizing the scrap film thereof is also poor in quality level and/or a problem that the film is inferior in heat aging resistance.

Example 4

To a mixture of bis(2-hydroxyethyl) terephthalate and oligomers produced in a usual manner from high-purity terephthalic acid and ethylene glycol were added 2.5 g/l aluminum acetylacetonate as a polycondensation catalyst in ethylene glycol in an amount of 0.015 mol % in terms of aluminum atom relative to the acid component in the polyester, 10 g/l dimethyl phenylphosphonate in ethylene glycol in an amount of 0.04 mol % in terms of dimethyl phenylphosphonate relative to the acid component, and 50 g/l lithium acetate.$2H_2O$ in ethylene glycol in an amount of 0.01 mol % in terms of lithium atom relative to the acid component, in an electrical-wire heating 2-L stainless steel autoclave equipped with a stirrer, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa.

The polymerization time (AP) necessary for the IV of the polyethylene terephthalate to reach 0.65 dl/g was 95 minutes, indicating that the polycondensation catalyst had a practical polymerization activity.

The polyethylene terephthalate having an TV of 0.65 dl/g, obtained in the polycondensation described above, was formed in a usual manner into chips. The PET resin chips were measured in a melt test to determine thermal stability parameter (TS), and as a result TS was 0.21, to indicate good thermal stability.

The PET resin chips obtained in the melt polymerization was measured for haze, and as a result, the Haze was 0.4%, indicating good transparency.

Using the PET resin chips obtained in the melt polymerization, a film was manufactured. The resultant film was excellent in transparency with less insoluble particle. Subsequently, recovered pellets were prepared from the film, and a film was prepared from the recovered[]pellets. The evaluation result of the thermal stability of the film was good with no discoloration.

Comparative Example 7

The same procedure as in Example 4 was conducted except that 2.5 g/l aluminum acetylacetonate was added as a catalyst in ethylene glycol in an amount of 0.01 mol % in terms of aluminum atom relative to the acid component in the polyester and 50 g/l lithium acetate.$2H_2O$ in ethylene glycol was added in an amount of 0.1 mol % in terms of lithium atom relative to the acid component.

In the polycondensation reaction, AP was 53 minutes, and when the PET resin chips obtained in the melt polymerization were examined for solution haze, the haze was 3.6%, indicating poor transparency.

When a film was manufactured from the PET resin chips obtained in the melt polymerization, the resultant film could not be satisfactory with many insoluble particles.

The PET obtained in Reference Example 1 was also simultaneously examined, and as a result, the Haze was 0.4%, indicating that this physical property was good.

As is evident from Example 4 and Comparative Example 7 described above, the PET resin having a solution haze value within the range described in the claims of the present invention is excellent in transparency with no or less insoluble particle in the film and superior in film quality level.

On the other hand, there arises a problem that the PET resin outside of the claims of the present invention gives a film inferior in quality level with many insoluble particles in the film.

Example 5

To a mixture of bis(2-hydroxyethyl) terephthalate and oligomers produced in a usual manner from high-purity terephthalic acid and ethylene glycol were added 10 g/l aluminum acetylacetonate as a polycondensation catalyst in ethylene glycol in an amount of 0.02 mol % in terms of aluminum atom relative to the acid component in the polyester, 10 g/l dimethyl phenylphosphonate in ethylene glycol in an amount of 0.03 mol % in terms of dimethyl phenylphosphonate relative to the acid component, and 50 g/l lithium acetate.$2H_2O$ in ethylene glycol in an amount of 0.01 mol % in terms of lithium atom relative to the acid component, in a 15-L stainless steel autoclave equipped with a stirrer, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa.

The polymerization time (AP) necessary for the IV of the polyethylene terephthalate to reach 0.65 dl/g was 130 minutes, indicating that the polycondensation catalyst had a practical polymerization activity.

The polyethylene terephthalate having an IV of 0.65 dl/g, obtained in the above polycondensation, was formed in a usual manner into chips. The color b value of the PET resin chips was 5.1, while the b value of PET resin chips polymerized by using antimony trioxide as the catalyst was 3.0 as shown in Reference Example 2, and accordingly Δb was 2.1.

Further, the PET resin chips were measured in a melt test to determine thermal stability parameter (TS). TS was 0.22, to indicate good thermal stability.

Using the PET resin chips obtained in the melt polymerization, a film was manufactured. The evaluation result of the discoloration of the film was good without discoloration in the film. Subsequently, recovered pellets were prepared from the film, and a film was prepared from the recovered pellets. The evaluation result of the thermal stability of the film was good without discoloration in the film, and the evaluation result of film thermal stability was also good.

Comparative Example 8

The same procedure as in Example 5 was conducted except that 10 g/l aluminum acetylacetonate was added as a catalyst in ethylene glycol in an amount of 0.015 mol % in terms of aluminum atom relative to the acid component in the polyester and 50 g/l lithium acetate.$2H_2O$ in ethylene glycol was added in an amount of 0.06 mol % in terms of lithium atom relative to the acid component.

AP was 107 minutes, but the color b value of the PET resin chips was 7.9, and accordingly Δb was 4.9, and the resin was remarkably yellow.

Using the PET resin chips, a film was manufactured. The film was discolored, and the evaluation result of film discoloration could not be satisfactory.

Reference Example 2

The same procedure as in Example 5 was conducted except that antimony trioxide was used as a catalyst in an amount of 0.05 mol % in terms of antimony atom relative to the acid component in PET. As antimony trioxide, the same solution as used in Reference Example 1 was used.

The PET obtained in Reference Example 2 indicated that AP was 110 minutes; TS, 0.21; and the color b value, 3.0 (Δb=0), and these characteristics and physical properties were good.

As is evident from Example 5 and Comparative Example 8 described above, the PET resin having the thermal stability parameter and color delta b parameter within the range described in the claims of the present invention becomes excellent in film thermal stability and in film quality level, and a film produced by reutilizing its scrap film is also excellent in quality level and the PET resin becomes also excellent in film color tone.

On the other hand, the PET resin outside of the claims of the present invention is poor in film quality level since the film is inferior in thermal stability and/or color tone, so there is a problem that a film produced by reutilizing the scrap film thereof is also poor in quality level and/or a problem that the film is discolored.

Example 6

To a mixture of bis(2-hydroxyethyl) terephthalate and oligomers produced in a usual manner from high-purity terephthalic acid and ethylene glycol were added 2.5 g/l aluminum acetylacetonate as a polycondensation catalyst in ethylene glycol in an amount of 0.015 mol % in terms of aluminum atom relative to the acid component in the polyester, 10 g/l dimethyl phenylphosphonate in ethylene glycol in an amount of 0.015 mol % in terms of dimethyl phenylphosphonate relative to the acid component, and 50 g/l lithium acetate.$2H_2O$ in ethylene glycol in an amount of 0.025 mol % in terms of lithium atom relative to the acid component, in an electrical-wire heating 2-L stainless steel autoclave equipped with a stirrer, and the mixture was stirred at 245° C. for 10 minutes in a nitrogen atmosphere at normal pressure. Then, the temperature was increased to 275° C. over 50 minutes while the pressure in the reaction system was gradually reduced to 13.3 Pa (0.1 Torr), and the polycondensation reaction was further conducted at 275° C. at 13.3 Pa under stirring. When predetermined stirring torque was reached, the autoclave was flushed with nitrogen and returned to normal pressure to terminate the polycondensation reaction. Thereafter, the polymer was quenched under slight pressure by discharging it in a strand form into cold water, and cut into cylindrical resin chips of approximately 3 mm in length and approximately 2 mm in diameter.

The polymerization time (AP) necessary for the IV of the polyethylene terephthalate to reach 0.65 dl/g was 78 minutes, indicating that the polycondensation catalyst had a practical polymerization activity.

The polyethylene terephthalate resin chips having an IV of 0.65 dl/g, obtained in the method described above, were measured for color L value and b value. The L value was 69.5, and the b value was 4.6. The L value of PET resin chips polymerized by using germanium dioxide as a catalyst was 66.7 and the b value thereof was 1.3 as shown in Reference Example 3, and accordingly ΔLg was 2.8 and Δbg was 3.3.

Using the PET resin chips obtained in the melt polymerization, a film was manufactured. The evaluation result of the color tone of the film was good with high transparency.

Comparative Example 9

The same procedure as in Example 6 was conducted except that 2.5 g/l aluminum acetylacetonate was added as a catalyst in ethylene glycol in an amount of 0.015 mol % in terms of aluminum atom relative to the acid component in the polyester and 50 g/l lithium acetate.2H$_2$O in ethylene glycol was added in an amount of 0.06 mol % in terms of lithium atom relative to the acid component.

AP was 62 minutes, and the color L value of the PET resin chips was 68.0, and the b value thereof was 6.4, and thus ΔLg was 1.3 and Δbg was 5.1, and the resin was remarkably yellow.

Using the PET resin chips, a film was manufactured. The film was discolored, and the evaluation result of film color tone could not be satisfactory.

Comparative Example 10

The same procedure as in Example 6 was conducted except that 2.5 g/l aluminum acetylacetonate was added as a catalyst in ethylene glycol in an amount of 0.015 mol % in terms of aluminum atom relative to the acid component in the polyester and 20 g/l cobalt (II) acetate.4H$_2$O in ethylene glycol in an amount of 0.005 mol % in terms of cobalt atom relative to the acid component.

The catalyst was slightly inferior in activity with an AP of 127 minutes. The PET resin chips had a color L value of 63.2 and a b value of −0.5, thus ΔLg was −3.5 and Δbg was −1.8, and the resin chips seemed to be gray discolored.

Using the PET resin chips, a film was manufactured. The evaluation result of film color tone could not be satisfactory owing to poor transmittance.

Reference Example 3

The same procedure as in Example 6 was conducted except that antimony trioxide was used as a catalyst in an amount of 0.05 mol % in terms of antimony atom relative to the acid component in PET. As antimony trioxide, the same solution as used in Reference Example 1 was used. In this example, AP was 65 minutes.

Reference Example 4

An electrical-wire heating 2-L stainless steel autoclave equipped with a stirrer was charged with high-purity terephthalic acid and ethylene glycol in the two-fold molal quantity, and triethylamine was added in an amount of 0.3 mol % relative to the acid component, and 8 g/l aqueous germanium dioxide was added in an amount of 0.03 mol % in terms of germanium atom relative to the acid component, and the mixture was subjected to esterification reaction for 130 minutes at a pressure of 0.25 MPa at 245° C. while water was distilled away from the system, whereby a mixture of bis(2-hydroxyethyl) terephthalate (BHET) having a degree of esterification of 95% and oligomers was obtained. Subsequently, the mixture was stirred at 245° C. for 10 minutes in a nitrogen atmosphere at normal pressure. Then, the temperature was increased to 275° C. over 50 minutes under stirring while the pressure in the reaction system was gradually reduced to 13.3 Pa (0.1 Torr), and the polycondensation reaction was further conducted at 275° C. at 13.3 Pa. When predetermined stirring torque was reached, the autoclave was flushed with nitrogen and returned to normal pressure to terminate the polycondensation reaction. Thereafter, the polymer was quenched under slight pressure by discharging it in a strand form into cold water and cut into cylindrical resin chips of approximately 3 mm in length and approximately 2 mm in diameter. The AP was 53 minutes, and the color L value of the PET resin chips was 66.7, and the b value thereof was 1.3.

In Reference Example 4, germanium dioxide having 97% or more purity, a commercial product produced by Jemco Ltd., was used. The germanium dioxide was used in the form of a solution obtained by dissolving it in water at a concentration of approximately 8 g/L under stirring at 80° C. for approximately 1 hour.

The results are shown in Table 2. As is evident from Example 6 and Comparative Examples 9 and 10, the PET resin having the color delta Lg parameter and color delta bg parameter within the range described in the claims of the present invention gives a film excellent in color tone.

On the other hand, there arises a problem that the PET resin outside of the claims of the present invention gives a film inferior in color tone.

Industrial Applicability

The polyester polymerization catalyst and the process for producing polyester according to the present invention can be used in production of a polyester polymer. The polyester of the present invention can be used in various fields for example in fibers for clothing and industrial materials, films for packaging or for magnetic tapes, sheets, hollow molded articles such as bottles, casings for electrical or electronic parts, and other molded articles of engineering plastics and so forth.

TABLE 1

| | Catalyst | | Evaluation result | | | |
| --- | --- | --- | --- | --- | --- | --- |
| | | | Polymerization | | | Film |
| | Component | Amount (mol %) | time (AP) (min) | [IV]$_f$ (dl/g) | TS | thermal stability |
| Example 1 | Aluminum acetylacetonate | 0.01 | | | | |
| | Dimethyl phenylphosphonate | 0.03 | 79 | 0.52 | 0.18 | ☐ |
| | Lithium acetate.2H$_2$O | 0.03 | | | | |

TABLE 1-continued

| | Catalyst | | Evaluation result | | | |
|---|---|---|---|---|---|---|
| | | | Polymerization | | | Film |
| | Component | Amount (mol %) | time (AP) (min) | $[IV]_f$ (dl/g) | TS | thermal stability |
| Comparative Example 1 | Aluminum acetylacetonate<br>Cobalt (II) acetate.4H$_2$O | 0.015<br>0.005 | 127 | 0.40 | 0.48 | x |
| Comparative Example 2 | Aluminum chloride<br>Cobalt (II) acetate.4H$_2$O | 0.03<br>0.01 | 104 | 0.38 | 0.55 | x |
| Comparative Example 3 | Aluminum hydroxide<br>Cobalt (II) acetate.4H$_2$O<br>tetra n-butoxy titanate | 0.015<br>0.0033<br>0.002 | 58 | 0.44 | 0.36 | x |
| Reference Example 1 | Antimony trioxide | 0.05 | 65 | 0.50 | 0.22 | |

TABLE 2

| | Catalyst | | Evaluation result | | | |
|---|---|---|---|---|---|---|
| | | | Polymerization | | | Film |
| | Component | Amount (mol %) | time (AP) (min) | ΔLg | Δbg | color tone |
| Example 6 | aluminum acetylacetonate<br>dimethyl phenylphosphonate<br>lithium acetate.2H$_2$O | 0.015<br>0.015<br>0.025 | 78 | 2.8 | 3.3 | ○ |
| Comparative Example 9 | aluminum acetylacetonate<br>lithium acetate.2H$_2$O | 0.015<br>0.06 | 62 | 1.3 | 5.1 | x |
| Comparative Example 10 | aluminum acetylacetonate<br>cobalt (II) acetate.4H$_2$O | 0.015<br>0.005 | 127 | −3.5 | −1.8 | x |
| Reference Example 3 | antimony trioxide | 0.05 | 65 | | | |
| Reference Example 3 | germanium dioxide | 0.03 | 53 | | | |

What is claimed is:

1. A process for producing polyester, comprising adding a polyester polymerization catalyst comprising at least one kind selected from the group consisting of aluminum and compounds thereof as a first metal-containing component, characterized in that the thermal stability parameter (TS) of polyethylene terephthalate (PET) polymerized by the polyester polymerization catalyst satisfies the following formula (1):

$$TS < 0.30 \quad (1)$$

wherein TS is a numerical value calculated in the formula;

$$TS = 0.245\{[IV]_f^{-1.47} - [IV]_i^{-1.47}\}$$

from the final intrinsic viscosity ($[IV]_f$) which is determined after 1 g Pet having an initial intrinsic viscosity ($[IV]_i$) of approximately 0.65 dl/g is placed in a glass test tube, vacuum-dried at 130° C. for 12 hours, and maintained in a molten state at 300° C. for 2 hours in a non-circulating nitrogen atmosphere, the polyester one or more of polyvalent carboxylic acids including discarboxylic acids and ester-forming derivatives thereof and one or more of polyvalent alcohols including gylcols, or comprising one or more of hydroxycarboxylic acids and ester-forming derivatives thereof.

2. The process for producing polyester according to claim 1, characterized in that the activity parameter (AP) further satisfies the following formula (2):

$$AP\ (min) < 2T\ (min) \quad (2)$$

wherein AP shows the time (min) necessary for polymerizing polyethylene terephthalate having an intrinsic viscosity of 0.65 dl/g at 275° C. under reduced pressure of 0.1 Torr in the presence of a predetermined amount of a catalyst, and T is the AP determined in the presence of antimony trioxide as a catalyst in an amount of 0.05 mol % in terms of antimony atom relative to the acid component in polyethylene terephthalate formed.

3. A process for producing polyester, comprising adding a polyester polymerization catalyst comprising at least one kind selected from the group consisting of aluminum and compounds thereof as a first metal-containing component, characterized in that the hydrolytic stability parameter (HS) of polyethylene terephthalate (PET) polymerized by the catalyst satisfies the following formula (4):

$$HS < 0.10 \quad (4)$$

wherein HS is a numerical value calculated in the formula;

$$HS = 0.245\{[IV]_{f2}^{-1.47} - [IV]_i^{-1.47}\}$$

from the intrinsic viscosity ($[IV]_{f2}$) which is determined after melt-polymerized resin chips of PET having an initial intrinsic viscosity ($[IV]_i$) of approximately 0.65 dl/g are frozen and milled to give powders of 20 meshes or less which are then vacuum-dried at 130° C. for 12 hours, and 1 g of the powder, together with 100 ml pure water, are placed in a beaker and then heated under stirring for 6 hours in a closed system at 130° C. under pressure, the polyester comprising one or more of polyvalent carboxylic acids including dicarboxylic acids and ester-forming derivatives thereof and one or more of polyvalent alcohols including glycols, or comprising one or more of hydroxycarboxylic acids and ester-forming derivatives thereof.

4. A process for producing polyester, comprising adding a polyester polymerization catalyst comprising at least one kind selected from the group consisting of aluminum and compounds thereof as a first metal-containing component, characterized in that the thermal oxidation stability parameter (TOS) of polyethylene terephthalate (PET) polymerized by the catalyst satisfies the following formula (3):

$$TOS<0.10 \tag{3}$$

wherein TOS is determined using the formula;

$$TOS=0.245\{[IV]_{f1}^{-1.47}-[IV]_{i}^{-1.47}\}$$

wherein $[IV]_i$ and $[IV]_{f1}$ refer to IV (dl/g) before and after a heating test respectively, from IV which is determined after melt-polymerized resin chips of PET having an IV of approximately 0.65 dl/g are frozen and milled to give powders of 20 meshes or less which are then vacuum-dried at 130° C. for 12 hours, and 0.3 g of the powders are placed in a glass test tube and vacuum-dried at 70° C. for 12 hours and then heated at 230° C. for 15 minutes in dry air over silica gel, the polyester comprising one or more of polyvalent carboxylic acids including dicarboxylic acids and ester-forming derivatives thereof and one or more of polyvalent alcohols including glycols, or comprising one or more of hydroxycarboxylic acids and ester-forming derivatives thereof.

5. The process for producing polyester according to claim 2, characterized in that the hydrolytic stability parameter (HS) of said PET further satisfies the following formula (4):

$$HS<0.10 \tag{4}$$

6. The process for producing polyester according to claim 2, characterized in that the thermal oxidation stability parameter (TOS) of said PET further satisfies the following formula (1):

$$TOS<0.10 \tag{3}$$

7. The process for producing polyester according to claim 2, characterized in that the solution haze value (Haze) of said PET further satisfies the following formula (5):

$$Haze<3.0(\%) \tag{5}$$

wherein the Haze shows a value measured after melt-polymerized resin chips of polyethylene terephthalate (PET) having an intrinsic viscosity of approximately 0.65 dl/g is dissolved in 3/1 mixed solvent (ratio by weight) of p-chlorophenol/1,1,2,2-tetrachloroethane to give 8 g/100 ml solution which is then measured by a haze meter.

8. The process for producing polyester according to claim 2, characterized in that the color delta b parameter (Δb) of said PET further satisfies the following formula (6):

$$\Delta b<4.0 \tag{6}$$

wherein Δb is a value obtained by subtracting the b value of PET produced by antimony trioxide as a catalyst from the Hunter's b value, measured by a color difference meter, of polyethylene terephthalate (PET) resin chips having an intrinsic viscosity of approximately 0.65 dl/g which were melt-polymerized by a predetermined catalyst, whereupon said antimony trioxide is added in an amount of 0.05 mol % in terms of antimony atom relative to the acid component in the polyethylene terephthalate formed.

9. A process for producing polyester, comprising adding a polyester polymerization catalyst comprising at least one kind selected from the group consisting of aluminum and compounds thereof as a first metal-containing component, characterized in that the color delta Lg parameter (ΔLg) and color delta bg parameter (Δbg) of polyethylene terephthalate polymerized by the catalyst satisfy the following formulas (7) and (8) respectively:

$$\Delta Lg>-2.0 \tag{7}$$

wherein ΔLg is a value obtained by subtracting the L value of PET produced by using germanium dioxide as a catalyst from the Hunter's L value, measured by a color difference meter, of PET resin chips having an intrinsic viscosity of approximately 0.65 dl/g which were melt-polymerized by a predetermined amount of a catalyst, whereupon said germanium dioxide is added in an amount of 0.03 mol % in terms of germanium atom relative to the acid component in the polyethylene terephthalate formed, $$\Delta bg<4.5 \tag{8}$$

wherein Δbg is a value obtained by subtracting the b value of PET produced by using germanium dioxide as a catalyst from the Hunter's b value, measured by a color difference meter, of PET resin chips having an intrinsic viscosity of approximately 0.65 dl/g which were melt-polymerized by a predetermined amount of a catalyst, whereupon said germanium dioxide is added in an amount of 0.03 mol % in terms of germanium atom relative to the acid component in the polyethylene terephthalate formed, the polyester comprising one or more of polyvalent carboxylic acids including dicarboxylic acids and ester-forming derivatives thereof and one or more of polyvalent alcohols including glycols, or comprising one or more of hydroxycarboxylic acids and ester-forming derivatives thereof.

10. The process for producing polyester according to claim 9, characterized in that the activity parameter (AP) further satisfies the following formula (2):

$$AP\ (min)<2T\ (min) \tag{2}$$

11. The process for producing polyester according to any of claims 1 to 10, characterized in that an alkali metal, an alkaline earth metal or a compound thereof is not added.

12. The process for producing polyester according to any of claims 1 to 10, wherein the catalyst further comprises at least one kind of second metal-containing component selected from the group consisting of an alkali metal, an alkaline earth metal and a compound thereof.

13. The process for producing polyester according to claim 12, wherein said second metal-containing component is an alkali metal or a compound thereof.

14. The process for producing polyester according to claim 13, wherein said alkali metal is at least one kind selected from Li, Na and K.

15. The process for producing polyester according to claim 12, wherein the amount of M (mol %) of the second metal-containing component relative to the whole carboxylic acid components constituting the polyester satisfies formula (9):

$$M \leq 0.05 \tag{9}$$

16. The process for producing polyester according to claim 1, 3, 4, or 9, wherein the catalyst further comprises a cobalt compound.

17. The process for producing polyester according to claim 1, 3, 4, or 9, wherein the at least one phosphorous compounds is represented by one of the following general formulae (chem 1) and (chem 2):

  (chem 1)

wherein $R^1$ and $R^2$ independently represent a hydrogen atom, an alkyl group and an aryl group containing 1 to 50 carbon atoms,

  (chem 2)

wherein $R^3$ and $R^4$ independently represent a hydrogen atom, an alkyl group and an aryl group containing 1 to 50 carbon atoms.

18. The process for producing polyester according to claim 1, 3, 4, or 9, wherein the catalyst further comprises at least one of an antimony compound and a germanium compound.

19. The process for producing polyester according to claim 1, 3, 4, or 9, wherein the catalyst further comprising an amount of at least one antimony compound of 50 ppm or less in terms of antimony atom relative to the polyester.

20. The process for producing polyester according to claim 1, 3, 4, or 9, wherein the catalyst further comprises an amount of at least one germanium compound added is 20 ppm or less in terms of germanium atom relative to the polyester.

21. Polyester produced by the process for producing polyester described in any one of claims 1 to 10.

22. Polyester produced by the process for producing polyester described in claim 16.

23. Polyester produced by the process for producing polyester described in claim 17.

24. Polyester produced by the process for producing polyester described in claim 18.

25. The process for producing polyester according to claim 1, 3, 4, or 9, wherein the at least one phosphorus compound is 0.0001 to 0.1 mol% relative to the number of moles of the whole constituent units of polycarboxylic acid components in the resulting polyester polymerized by the polyester polymerization catalyst.

26. The process for producing polyester according to claim 1, 3, 4, or 9, wherein the at least one phosphorus compound is 0.005 to 0.05 mol% relative to the number of moles of the whole constituent units of polycarboxylic acid components in the resulting polyester polymerized by the polyester polymerization catalyst.

* * * * *